(12) United States Patent
Xiang et al.

(10) Patent No.: US 12,299,920 B2
(45) Date of Patent: May 13, 2025

(54) METHOD FOR DETECTING HAND KEY POINTS, METHOD FOR RECOGNIZING GESTURE, AND RELATED DEVICES

(71) Applicant: BIGO TECHNOLOGY PTE. LTD., Singapore (SG)

(72) Inventors: Wei Xiang, Guangzhou (CN); Yifeng Wang, Guangzhou (CN)

(73) Assignee: BIGO TECHNOLOGY PTE. LTD., Singapore (SG)

(*) Notice: Subject to any disclaimer, the term of this patent is extended or adjusted under 35 U.S.C. 154(b) by 399 days.

(21) Appl. No.: 17/780,694

(22) PCT Filed: Aug. 7, 2020

(86) PCT No.: PCT/CN2020/107960
§ 371 (c)(1),
(2) Date: May 27, 2022

(87) PCT Pub. No.: WO2021/103648
PCT Pub. Date: Jun. 3, 2021

(65) Prior Publication Data
US 2023/0252670 A1    Aug. 10, 2023

(30) Foreign Application Priority Data

Nov. 29, 2019   (CN) .......................... 201911198688.8

(51) Int. Cl.
*G06T 7/73* (2017.01)
*G06V 40/10* (2022.01)
*G06V 40/20* (2022.01)

(52) U.S. Cl.
CPC ................ *G06T 7/73* (2017.01); *G06V 40/11* (2022.01); *G06V 40/20* (2022.01); *G06T 2207/20076* (2013.01); *G06T 2207/30196* (2013.01)

(58) Field of Classification Search
CPC ............. G06T 7/73; G06T 2207/20076; G06T 2207/30196; G06V 40/11; G06V 40/20; G06V 40/113; G06F 18/214
See application file for complete search history.

(56) References Cited

U.S. PATENT DOCUMENTS

| 6,204,852 B1 | 3/2001 | Gannon |
| 10,338,387 B2 | 7/2019 | Gannon et al. |

(Continued)

FOREIGN PATENT DOCUMENTS

| CN | 102298649 A | 12/2011 |
| CN | 104778746 A | 7/2015 |

(Continued)

OTHER PUBLICATIONS

International Search Report of the International Searching Authority for State Intellectual Property Office of the People's Republic of China in PCT application No. PCT/CN2020/107960 issued on Nov. 18, 2020, which is an international application corresponding to this U.S. application.

(Continued)

*Primary Examiner* — Qian Yang
(74) *Attorney, Agent, or Firm* — Kolitch Romano Dascenzo Gates LLC

(57) ABSTRACT

Provided is a method for detecting hand key points. The method includes: acquiring a hand image to be detected; acquiring heat maps of the hand key points by inputting the hand image into a pre-trained heat map model, wherein the heat maps include two-dimensional coordinates of the hand key points; acquiring hand structured connection information by inputting the heat maps and the hand image into a pre-trained three-dimensional information prediction model; and determining, based on the hand structured connection information and the two-dimensional coordinates in the heat (Continued)

maps, three-dimensional coordinates of the hand key points in a world coordinate system.

18 Claims, 5 Drawing Sheets

(56) References Cited

U.S. PATENT DOCUMENTS

| | | | | |
|---|---|---|---|---|
| 2008/0122869 | A1* | 5/2008 | Aratani | G06T 7/246 345/633 |
| 2012/0068917 | A1 | 3/2012 | Huang et al. | |
| 2018/0267599 | A1 | 9/2018 | Holman et al. | |
| 2019/0180473 | A1 | 6/2019 | Guleryuz | |
| 2019/0371059 | A1 | 12/2019 | Toubal | |
| 2020/0184721 | A1* | 6/2020 | Ge | G06N 3/045 |
| 2020/0387698 | A1 | 12/2020 | Yi et al. | |
| 2021/0124425 | A1 | 4/2021 | Liu et al. | |
| 2021/0279456 | A1 | 9/2021 | Luo et al. | |

FOREIGN PATENT DOCUMENTS

| | | |
|---|---|---|
| CN | 108305321 A | 7/2018 |
| CN | 108399367 A | 8/2018 |
| CN | 109214282 A | 1/2019 |
| CN | 109271933 A | 1/2019 |
| CN | 109858524 A | 6/2019 |
| CN | 109871857 A | 6/2019 |
| CN | 110020633 A | 7/2019 |
| CN | 110147767 A | 8/2019 |
| CN | 110163048 A | 8/2019 |
| CN | 110188700 A | 8/2019 |
| CN | 110291560 A | 9/2019 |
| CN | 110443148 A | 11/2019 |
| CN | 110443154 A | 11/2019 |
| CN | 110991319 A | 4/2020 |

OTHER PUBLICATIONS

The State Intellectual Property Office of People's Republic of China, First Office Action in Patent Application No. CN201911198688.8 issued on Apr. 21, 2021, which is a foreign counterpart application corresponding to this U.S. Patent Application, to which this application claims priority.

The State Intellectual Property Office of People's Republic of China, Second Office Action in Patent Application No. CN201911198688.8 issued on Jun. 30, 2021, which is a foreign counterpart application corresponding to this U.S. Patent Application, to which this application claims priority.
Notification to Grant Patent Right for Invention No. 201911198688.8 issued on Sep. 13, 2021.
Luo Chenxu, et al., OriNet: A Fully Convolutional Network for 3D Human Pose Estimation, arXiv, Nov. 12, 2018, pp. 1-13.
Miao Yong-Wei, et al., "Hand Gesture Recognition based on Joint Rotation Feature and Fingertip Distance Feature," Chinese Journal of Computers vol. 42 No. 1, Oct. 16, 2019, pp. 1-16.
Cai Yujun, et al., Weakly-Supervised 3D Hand Pose Estimation from Monocular RGB Images, Computer Vision, Oct. 6, 2018, pp. 678-694.
Zhou Xingyi, et al., Towards 3D Human Pose Estimation in the Wild: A Weakly-Supervised Approach, ICCV, Dec. 25, 2017, pp. 398-407.
Extended European Search Report Communication Pursuant to Rule 62 EPC, dated Nov. 21, 2022 in Patent Application No. EP 20893388.7, which is a foreign counterpart application of this US application.
Ge, Liuhao, et al.; "Robust 3D Hand Pose Estimation in Single Depth Images: from Single-View CNN to Multi-View CNNs"; 2016 IEEE Conference on Computer Vision and Pattern Recognition (CVPR), pp. 3593-3601, the whole document, Jun. 1, 2016.
Mueller, Franziska, et al.; "GANerated Hands for Real-Time 3D Hand Tracking from Monocular RGB"; 2018 IEEE/CVE Conference on Computer Vision and Pattern Recognition, IEEE, pp. 49-59, abstract, figures 2,8, sec.3.3, Jun. 18, 2018.
Wan, Chengde, et al.; "Dense 3D Regression for Hand Pose Estimation"; 2018 IEEE/CVF Conference on Computervision and Pattern Recognition, IEEE, pp. 5147-5156, the whole document, Jun. 18, 2018.
Wu, Xiaokun, et al.; "HandMap: Robust Hand Pose Estimation via Intermediate Dense Guidance Map Supervision"; SAT 2015 18th International Conference, Austin, TX, USA, Sep. 24-27, 2015; [Lecture Notes in Computer Science; Lect.Notes Computer], Springer, Berlin, Heidelerg, pp. 246-262, the whole document, Oct. 6, 2018.
Zhuang, Kai; "Monocular Multi-feature Fusion Hand Gesture Recognition Method Based on Multi-core Learning"; Journal of Physics: Conference Series, vol. 1288, No. 1, p. 012054, the whole document, Aug. 1, 2019.

* cited by examiner

METHOD FOR DETECTING HAND KEY POINTS, METHOD FOR RECOGNIZING GESTURE, AND RELATED DEVICES

CROSS-REFERENCE TO RELATED APPLICATION

The present application is a U.S. national stage of international application No. PCT/CN2020/107960, filed on Aug. 7, 2020, which claims priority to Chinese Patent Application No. 201911198688.8 filed to the China National Intellectual Property Administration on Nov. 29, 2019, the contents of which are herein incorporated by references in their entireties.

TECHNICAL FIELD

The present disclosure relates to the field of computer vision technologies, and, for example, relates to a method and apparatus for detecting hand key points, a method and apparatus for recognizing a gesture, a device, and a storage medium.

BACKGROUND

In the field of computer vision technologies, gesture recognition is widely used in human-computer interaction, sign language recognition and other scenarios. The gesture recognition relies on detection of hand key points. With the popularity of mobile terminals and mobile Internet, the gesture recognition is also widely used in the mobile terminals.

SUMMARY

Embodiments of the present disclosure provide a method and apparatus for detecting hand key points, a method and apparatus for recognizing a gesture, a device, and a storage medium.

A method for detecting hand key points is provided and includes:
  acquiring a hand image to be detected;
  acquiring heat maps of the hand key points by inputting the hand image into a pre-trained heat map model, wherein the heat maps include two-dimensional coordinates of the hand key points;
  acquiring hand structured connection information by inputting the heat maps and the hand image into a pre-trained three-dimensional information prediction model; and
  determining, based on the hand structured connection information and the two-dimensional coordinates in the heat maps, three-dimensional coordinates of the hand key points in a world coordinate system.

A method for recognizing a gesture is further provided and includes:
  acquiring a hand image to be recognized;
  detecting key points in the hand image; and
  recognizing, based on the key points, the gesture expressed by a hand in the hand image;
  wherein detecting the key points in the hand image includes: detecting the key points in the hand image according to the method for detecting the hand key points according to the present disclosure.

An apparatus for detecting hand key points is further provided and includes:
  a hand image acquiring module, configured to acquire a hand image to be detected;
  a heat map acquiring module, configured to acquire heat maps of the hand key points by inputting the hand image into a pre-trained heat map model, wherein the heat maps include two-dimensional coordinates of the hand key points;
  a hand structured connection information acquiring module, configured to acquire hand structured connection information by inputting the heat maps and the hand image into a pre-trained three-dimensional information prediction model; and
  a three-dimensional coordinate calculating module, configured to determine, based on the hand structured connection information and the two-dimensional coordinates in the heat maps, three-dimensional coordinates of the hand key points in a world coordinate system.

An apparatus for recognizing a gesture is further provided and includes:
  a hand image acquiring module, configured to acquire a hand image to be recognized;
  a key point detecting module, configured to detect key points in the hand image; and
  a gesture recognizing module, configured to recognize, based on the key points, the gesture expressed by a hand in the hand image;
  wherein the key point detecting module is configured to detect the key points in the hand image according to the apparatus for detecting the hand key points according to the present disclosure.

A device is further provided and includes:
  one or more processors; and
  a memory, configured to store one or more programs, wherein
  the one or more processors, when loading and running the one or more programs, is caused to perform the method for detecting the hand key points and/or the method for recognizing the gesture according to the present disclosure.

A computer-readable storage medium storing at least one computer program is further provided. Wherein the at least one computer program, when loaded and run by a processor, causes the computer device to perform the method for detecting the hand key points and/or the method for recognizing the gesture according to the present disclosure.

DETAILED DESCRIPTION

The present disclosure is described hereinafter in combination with the accompanying drawings and the embodiments. For convenience of description, the accompanying drawings show only some, but not all, structures related to the present disclosure.

The hand key points refer to multiple joint points in a hand, and the most commonly used method for detecting the hand key points in the related art is outputting three-dimensional coordinates of the hand key points using a deep convolutional neural network. For example, after image features of a two-dimensional hand image are extracted using the deep convolutional neural network containing multiple convolutional layers and fully connected layers, the three-dimensional coordinates of the hand key points are regressed through the fully connected layers. Such a deep convolutional neural network is complex, and the amount of data calculation is large. However, due to a limitation of a calculation capacity of the mobile terminal, after the approach of directly regressing the three-dimensional coordinates of the hand key points using the deep convolutional neural network is applied to the mobile terminal, the calculation time is long, and it is difficult to detect the hand key points in real time through the mobile terminal, which limits the application of the gesture recognition in the mobile terminal.

First Embodiment

Figure 1:
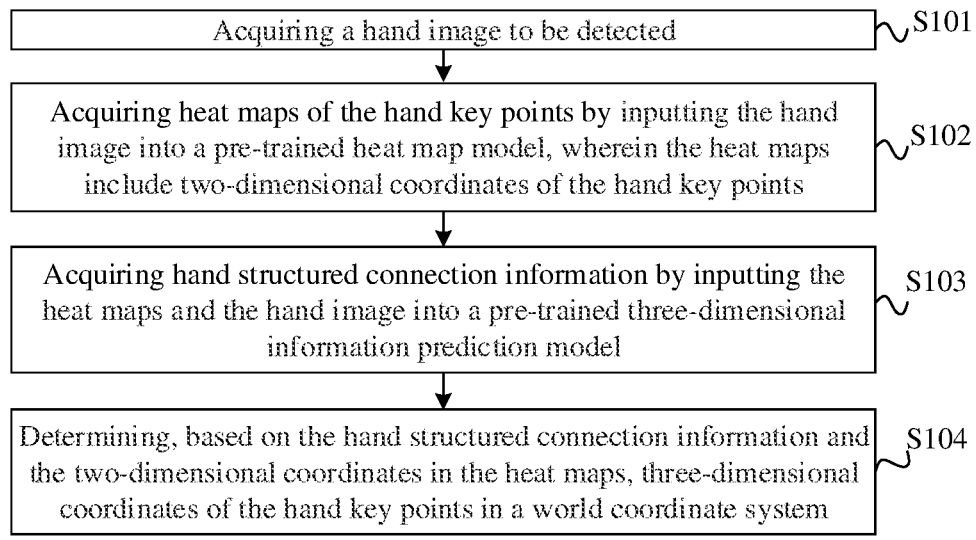
FIG. 1 is a flowchart of a method for detecting hand key points according to a first embodiment of the present disclosure.

FIG. 1 is a flowchart of a method for detecting hand key points according to a first embodiment of the present disclosure. This embodiment of the present disclosure is applicable to the case of detecting the hand key points, and the method may be performed by an apparatus for detecting hand key points. The apparatus may be implemented via software and/or hardware, and integrated into a device for performing the method. As shown in FIG. 1, the method for detecting hand key points according to this embodiment of the present disclosure may include the following processes.

In S101, a hand image to be detected is acquired.

In this embodiment of the present disclosure, the hand image to be detected may be an image of which three-dimensional coordinates of the hand key points need to be detected. The hand image may be a bitmap (bmp), a joint photographic experts group (jpg), a portable network graphic (png), a tag image file format (tif), and images containing physiological characteristics of a hand in storage formats. In addition, the hand image may be a color image.

In practical applications, the hand image may be acquired in scenarios of gesture recognition application. The scenarios of gesture recognition application may be scenarios such as a human-computer interaction (a virtual reality (VR) application) controlled by a gesture, and a sign language recognition (live streaming of sign language teaching). In the above scenarios, the hand image may be collected by an image collection apparatus, or the hand image may be acquired from the image by detecting the image. The scenario and method for acquiring the hand image are not limited in this embodiment of the present disclosure.

In S102, heat maps of the hand key points are acquired by inputting the hand image into a pre-trained heat map model, wherein the heat maps include two-dimensional coordinates of the hand key points.

In this embodiment of the present disclosure, the heat map may be an image displaying an area of the hand key point in the form of special highlighting, and a value associated with a position in the heat map is a probability of the hand key point at the position. In the case that the probability of the position is greater, the position is closer to a center of a Gaussian kernel in the heat map. Therefore, the center of the Gaussian kernel is the position with the greatest probability, that is, the position of the hand key point.

The heat map model may be pre-trained, and the heat map model may output the heat maps of the hand key points. The heat map model may be acquired using one or more neural networks. For example, the heat map model may be trained using a deep convolutional neural network. For example, for the hand image of which the two-dimensional coordinates of the hand key points are acquired, at first, one Gaussian kernel is generated based on the two-dimensional coordinates of the hand key point, and the Gaussian kernel is the Gaussian kernel of the heat map. When in training, one heat map is output by inputting the hand image into the deep convolutional neural network, and the Gaussian kernel in the output heat map and the previously generated Gaussian kernel are used to calculate a loss rate. Then parameters of the deep convolutional neural network are adjusted to continuously iterate the deep convolutional neural network. The iteration is stopped until the loss rate is less than a preset value or a preset number of iterations are reached, and the finally acquired deep convolutional neural network is the heat map model. After one hand image is input into the heat map model, the heat maps of multiple hand key points of the hand may be acquired, and the center of the Gaussian kernel in the heat map is the position of the hand key point, that is, the coordinates of the center of the Gaussian kernel are the two-dimensional coordinates of the hand key point.

In S103, hand structured connection information is acquired by inputting the heat maps and the hand image into a pre-trained three-dimensional information prediction model.

Figure 2:
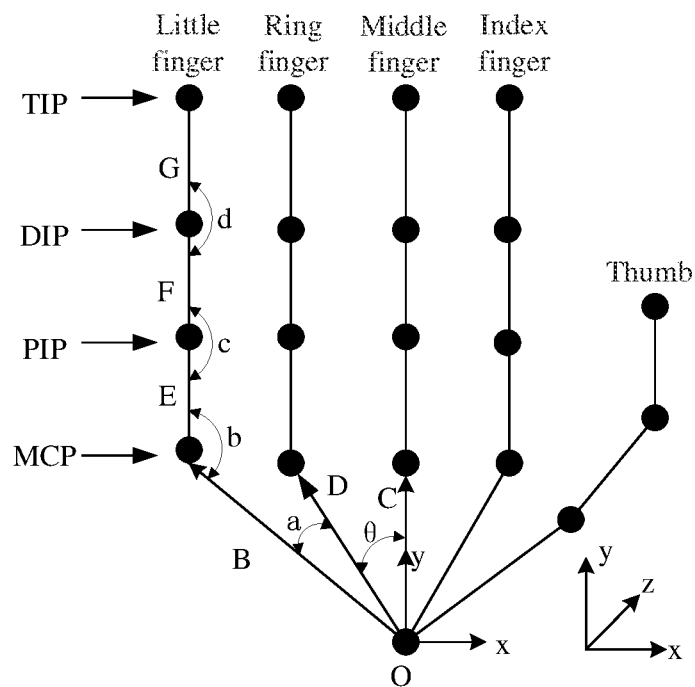
FIG. 2 is a schematic diagram of hand key points according to an embodiment of the present disclosure.

FIG. 2 shows a schematic diagram of the hand key points. The hand key points may include wrist key point O and multiple key points (key points MCP, PIP, DIP and TIP) of each finger. As shown in FIG. 2, the wrist key point is point O, each finger includes four key points: MCP, PIP, DIP and TIP, and the wrist key point and the key points of multiple fingers form the hand key points of the hand.

In this embodiment of the present disclosure, the hand structured connection information may include Euler angles of the hand and joint bending angles formed by the multiple hand key points, and the Euler angles of the hand may be a representation of a hand coordinate system relative to a world coordinate system and express a pose of the hand in a three-dimensional space. The joint bending angles formed by the hand key points may include an included angle a formed by connection lines between the key points MCP of two adjacent fingers and the wrist key point O, and further include an included angle b at the key point MCP, an included angle c at the key point PIP, and an included angle d at the key point DIP.

In this embodiment of the present disclosure, the Euler angles of the hand marked by a manual marking method, the angles at hand joints acquired by a sensor, and the heat maps of the multiple hand key points predicted by the heat map model may be firstly taken as training data to train the three-dimensional information prediction model, and the three-dimensional information prediction model may be various neural networks. In the case that the heat maps and the hand image are input into the trained three-dimensional information prediction model, the hand structured connection information including the Euler angles of the hand and the joint bending angles formed by multiple hand key points may be acquired.

In S104, three-dimensional coordinates of the hand key points in the world coordinate system are determined based on the hand structured connection information and the two-dimensional coordinates in the heat maps.

In this embodiment of the present disclosure, after the hand structured connection information is acquired by the three-dimensional information prediction model, a direction vector of a vector formed by two adjacent hand key points in the hand coordinate system may be determined based on the hand structured connection information, and then the direction vector is converted into a direction vector in the world coordinate system based on the Euler angles. Meanwhile, the two-dimensional coordinates of each hand key point may be acquired based on the heat map, such that a vector length of the vector formed by the two hand key points may be acquired. After the vector length and the direction vector of the vector are acquired, the vector may be determined. Meanwhile, three-dimensional coordinates of the wrist key point in the world coordinate system may be acquired according to an imaging principle of the hand image, and three-dimensional coordinates of each hand key point in the world coordinate system may be acquired according to a vector addition principle.

In this embodiment of the present disclosure, after the hand image to be detected is acquired, the heat maps including the two-dimensional coordinates of the hand key points are acquired by the heat map model, and then the hand structured connection information is acquired by the three-dimensional information prediction model. Eventually, the three-dimensional coordinates of the hand key points are calculated based on the two-dimensional coordinates and the hand structured connection information. Compared with direct regression of the three-dimensional coordinates of the hand key points using the deep neural network, the two-dimensional coordinates and the hand structured connection information are predicted successively by the two models to calculate the three-dimensional coordinates of the hand key points. Both the models have simple structures and small amount of calculation, and are applicable to the mobile terminal with a limited calculation capacity. In addition, due to the simple structures and the small amounts of calculation of the models, the time of the detection of the hand key points is short, such that the hand key points may be detected in the mobile terminal in real time, and it is beneficial to apply the gesture recognition to the mobile terminal.

Second Embodiment

Figure 3:
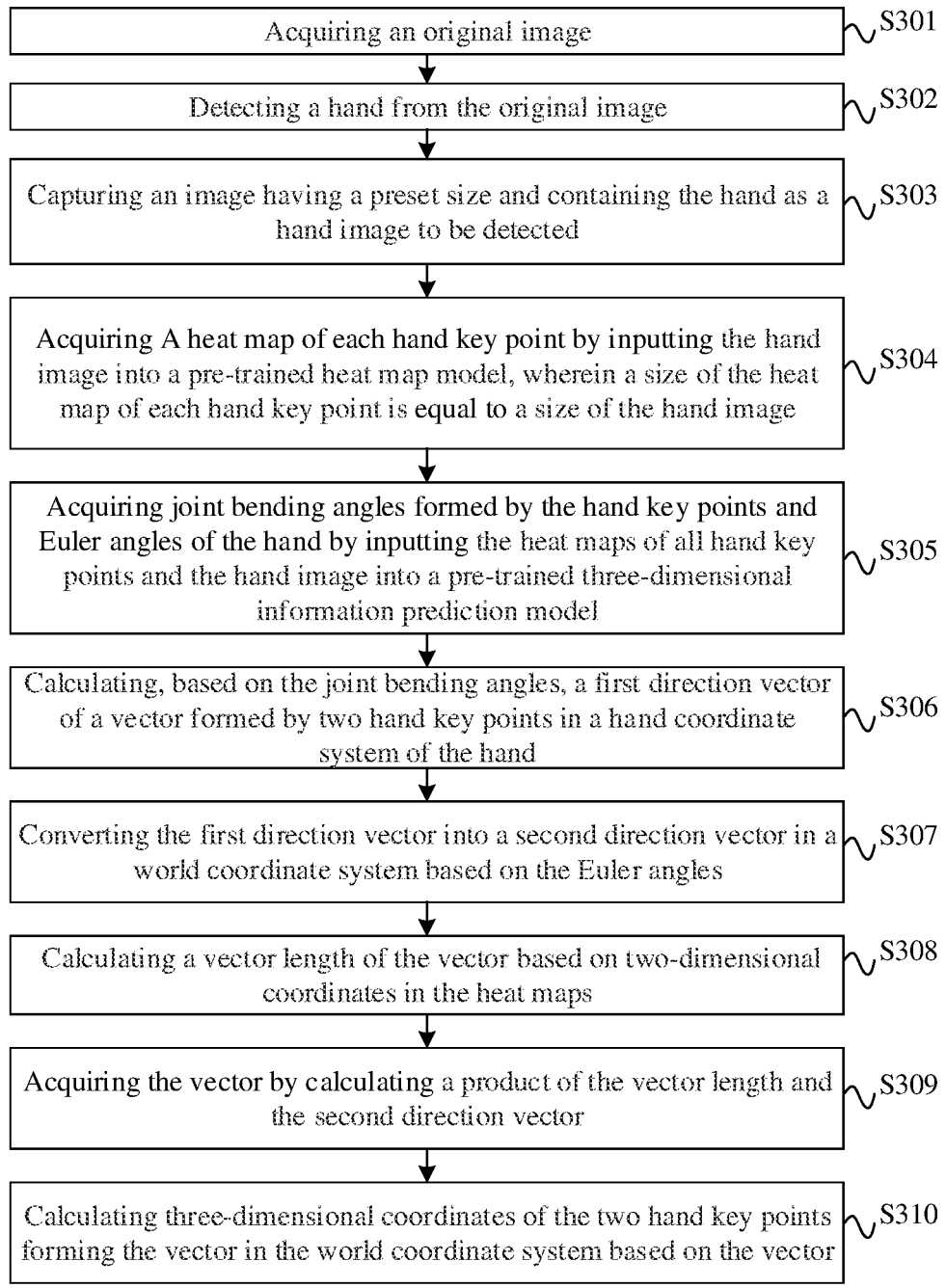
FIG. 3 is a flowchart of a method for detecting hand key points according to a second embodiment of the present disclosure.

FIG. 3 is a flowchart of a method for detecting hand key points according to a second embodiment of the present disclosure, and this embodiment of the present disclosure is described on the basis of the foregoing first embodiment. As shown in FIG. 3, the method for detecting hand key points according to this embodiment of the present disclosure may include the following processes.

In S301, an original image is acquired.

In an embodiment of the present disclosure, the original image may be an image including a hand. For example, an image including an entire human body or an image including an arm and a palm. The original image may be an image collected by an image collection apparatus. For example, an image collected by a camera in live streaming, or an image extracted from multimedia video data.

In S302, the hand is detected from the original image.

The hand may be a part from a wrist to the end of a finger. In this embodiment of the present disclosure, the hand may be detected from the original image by a hand detection algorithm. For example, the hand in the original image may be detected using a semantic segmentation network, or in other ways, and the method for detecting the hand from the original image is not limited in this embodiment of the present disclosure.

In S303, an image having a preset size and containing the hand is captured as the hand image to be detected.

Generally, in practical applications of detecting the hand key points, assuming that the hand in the original image is positioned in a hand detector to detect the hand key points, an image area containing the hand may be firstly captured from the original image as the hand image, and the image area may be an area of a preset size. For example, the shape of the image area may be a square, and the square area is scaled to a size of 64×64. For a 64×64×3 three-dimensional tensor of each hand image, 64×64 is the size of the hand image, and 3 is RGB channels of a two-dimensional image.

In this embodiment of the present disclosure, the image containing the hand and having the preset size is captured from the original image as the hand image to be detected, such that a background contained in the hand image is reduced, and more attentions are paid to the hand per se in subsequent model processing. Therefore, the amount of data acquired to be processed is reduced, and efficiency of detecting the hand key points can be improved.

In S304, the heat map of each hand key point is acquired by inputting the hand image into the pre-trained heat map model, wherein a size of the heat map of each hand key point is equal to the size of the hand image.

The heat map model in this embodiment of the present disclosure may be pre-trained, and the heat map model may output the heat maps of the hand key points. The heat map model may be acquired using one or more neural networks. For example, the heat map model may be trained using a deep convolutional neural network. After the hand image is input, the heat map model may acquire the heat maps of multiple hand key points of the hand. The center of the Gaussian kernel in the heat map is the position of the hand key point, and the coordinates of the center of the Gaussian kernel are the two-dimensional coordinates of the hand key point.

In this embodiment of the present disclosure, the hand image may be the 64×64×3 three-dimensional tensor after scaling. After the three-dimensional tensor is input into the heat map model, the heat map model is actually the deep neural network, image features are extracted using the deep neural network, and the heat maps of all hand key points are finally output. As shown in FIG. 2, there are 20 hand key points in total, and the heat map model outputs 20 heat maps. The size of each heat map is equal to the size of the hand image. That is, the size of the heat map is also 64×64.

In S305, joint bending angles formed by the hand key points and Euler angles of the hand are acquired by inputting the heat maps of all hand key points and the hand image into the pre-trained three-dimensional information prediction model.

In this embodiment of the present disclosure, the three-dimensional information prediction model may be trained based on the heat maps including the Euler angles of the hand, the angles at hand joints, and multiple hand key points predicted by the heat map model. The three-dimensional information prediction model may output the Euler angles of the hand and angles of the included angles formed by joint bending of multiple hand key points after the heat maps of the hand key points and the hand image are input.

In this embodiment of the present disclosure, the heat maps of the hand key points and the hand image have the same size, and the hand image is a 64×64×3 three-dimensional tensor. There are 20 hand key points, and the heat maps of all hand key points may be represented as a 64×64×20 three-dimensional tensor. The above two tensors are connected to form a 64×64×23 tensor, and the 64×64×23 tensor is input into the trained three-dimensional information prediction model, so as to acquire the joint bending angles formed by the multiple hand key points and the Euler angles of the hand.

In S306, a first direction vector of a vector formed by two hand key points in a hand coordinate system of the hand is calculated based on the joint bending angles.

The vector is an amount having a size and direction. In this embodiment of the present disclosure, any two hand key points may form a vector, the size of the vector is a distance between the two hand key points, and the direction of the vector is the direction of a connection line between the two hand key points. As shown in FIG. 2, the vector B is the vector from the wrist key point O to the proximal phalanx key point MCP of a little finger. Based on this, calculating, based on the predicted joint bending angles, the first direction vector of the vector formed by the two hand key points in the hand coordinate system of the hand may include the following processes.

In S3061, a first direction vector of a vector from the wrist key point to a proximal phalanx key point of a middle finger is determined based on a pre-established hand model.

The hand model is established assuming that the wrist key point O and the key points MCP of all fingers are coplanar in the three-dimensional space, and the five points of the wrist key point O and the key points MCP, PIP, DIP and TIP of each finger are coplanar in the three-dimensional space and parallel to a plane where a palm is disposed. Due to the limitation of a hand skeleton, the joints of each finger can only perform some bending and stretching movements. Thus, the key points of multiple fingers other than the wrist key point O are always coplanar. In order to simplify the problem, it is assumed that the wrist key point O and the key points of each finger are also coplanar.

Based on the above hand model, the hand coordinate system is established as follows (as shown in FIG. 2).

A direction from the wrist key point O to the key point MCP (the proximal phalanx key point) of the middle finger is taken as a positive direction of a y-axis to establish the y-axis. It can be known that the y-axis is disposed on the plane where the palm is disposed. On this plane, a direction perpendicular to the y-axis and on the side of a thumb is taken as a positive direction of a x-axis to establish the x-axis, and a direction perpendicular to the xy plane and a back of the hand towards is taken as a positive direction of a z-axis to establish the z-axis.

Based on the hand coordinate system established above, the first direction vector (0, 1, 0) of vector C from the wrist key point O to the key point MCP of the middle finger may be acquired.

In S3062, the first direction vector of the vector from the wrist key point to the proximal phalanx key point of each finger is calculated based on the joint bending angles, and the first direction vector of the vector from the wrist key point to the proximal phalanx key point of the middle finger.

The direction of the vector is independent of the vector length. In the case that the direction vector of a vector is acquired, the direction vector of another vector may be acquired by rotating the vector with the known direction vector by an angle. The vector from the wrist key point to the proximal phalanx key point MCP of each finger may be acquired from the first direction vector of the vector from the wrist key point to the proximal phalanx key point of the middle finger and the predicted joint bending angles.

As shown in FIG. 2, for a vector D from the wrist key point O to a proximal phalanx key point MCP of a ring finger, a first direction vector of the vector D may be acquired by the vector C and an included angle $\theta$. That is, the first direction vector of the vector D may be acquired by rotating the direction vector of the vector C by the angle $\theta$, that is, the first direction vector of the vector D is sin $\theta$, cos $\theta$, 0.

Similarly, the first direction vectors of the vectors from the wrist key point O to the proximal phalanx key points MCP of other fingers may be acquired by rotating the adjacent vectors by an included angles, and the included angles are angles at joint bending positions predicted by the three-dimensional information prediction model, such as $\theta$ and a in FIG. 2. After process S3062, the first direction vectors of the vectors from the wrist key point O to the key points MCP of the little finger, the ring finger, the middle finger, an index finger and the thumb may be acquired.

In S3063, for each finger, the first direction vector of the vector between two key points connected by each phalanx of the finger is calculated based on the joint bending angles, and the first direction vector of the vector from the wrist key point to the proximal phalanx key point of each finger.

As shown in FIG. 2, for each finger, in the case that the first direction vector of the vector from the wrist key point O to the proximal phalanx key point MCP of the finger is acquired, the first direction vector of the vector between the two key points connected by each phalanx of the finger is calculated based on the first direction vector of the vector from the wrist key point O to the proximal phalanx key point MCP of the finger, and the multiple joint bending angles predicted by the three-dimensional information prediction model.

As shown in FIG. 2, taking the little finger as an example, the first direction vector of the vector B from the wrist key point O to the proximal phalanx key point MCP of the little finger has been calculated in the S3062, and the angles of the joint bending included angles b, c, and d at the key points MCP, PIP, and DIP of the little finger may be acquired by the three-dimensional information prediction model. Thus, in the little finger, an included angle between a vector E formed by the key point MCP and the key point PIP and the vector B is b, an included angle between a vector F formed by the key point PIP and the key point DIP and the vector B is a sum of the included angle b and the included angle c, and an included angle between a vector G formed by the key point DIP and the key point TIP and the vector B is a sum of the included angle b, the included angle c and the included angle d. In the case that the included angle between each vector and the vector from the wrist key point O to the proximal phalanx key point MCP is acquired, the first direction vector of each vector may be acquired by rotating the vector B from the wrist key point O to the proximal phalanx key point MCP of the finger.

Taking the little finger as an example, the method for calculating the first direction vectors of the vectors formed by multiple key points on the little finger is described, and the method for calculating the first direction vectors of the vectors formed by multiple key points of other fingers is similar, which are not repeated here in detail.

In S307, the first direction vector is converted into a second direction vector in a world coordinate system based on the Euler angles.

In practical applications, the first direction vector of each vector is the direction vector in the hand coordinate system. As the hand has a pose in space, the first direction vector of each vector needs to be converted to the direction vector in the world coordinate system, that is, the second direction vector. The Euler angles may be used to calculate an Euler rotation matrix, and the second direction vector of the first direction vector in the world coordinate system is acquired by calculating a product of the first direction vector and the Euler rotation matrix.

Figure 4:
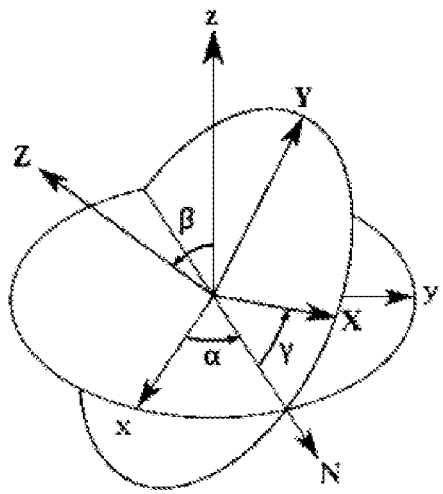
FIG. 4 is a schematic diagram of a hand coordinate system and a world coordinate system in an embodiment of the present disclosure.

FIG. 4 is a schematic diagram of the hand coordinate system and the world coordinate system in an embodiment of the present disclosure. As shown in FIG. 4, the Euler angles may be represented by three included angles $\alpha$, $\beta$, $\gamma$. Coordinate system xyz is the hand coordinate system, and coordinate system XYZ is the world coordinate system. The included angle between the x-axis and N-axis is $\alpha$, the included angle between the z-axis and the Z-axis is $\beta$, the included angle between the N-axis and X-axis is $\gamma$, and the N-axis is a position of rotating the x-axis around the z-axis.

Assuming that the palm is parallel to the x-y plane, a line L from the middle finger joint to the wrist key point is perpendicular to the x-axis and parallel to the y-axis, the state of the hand at this time is an initial state. The hand in the initial state may be rotated by the Euler angles to acquire the state of the hand in a current three-dimensional space, that is, the pose of the hand in the world coordinate system. In a rotation process of the hand, the hand coordinate system is rotated with the rotation of the hand. Thus the coordinates of the hand key points in the hand coordinate system are unchanged, and the coordinates of the hand key points in the world coordinate system are changed. The rotation process of the hand may be that, the hand is firstly rotated by the angle $\alpha$ around the z-axis, then rotated by the angle $\theta$ around the N-axis, and finally rotated by the angle $\gamma$ around Y-axis to acquire a current state of the hand in the world coordinate system.

In this embodiment of the present disclosure, the Euler rotation matrix expresses a conversion relation of the vector from the hand coordinate system to the world coordinate system, and the Euler rotation matrix is as follows:

$$R_{Z'Y'X'}(\alpha, \beta, \gamma) =$$

$$R_Z(\alpha)R_Y(\beta)R_Z(\gamma) = \begin{bmatrix} ca c\beta & ca s\beta s\gamma - sa c\gamma & ca s\beta c\gamma + sa s\gamma \\ sa c\beta & sa s\beta s\gamma + ca c\gamma & sa s\beta c\gamma - ca s\gamma \\ -s\beta & c\beta s\gamma & c\beta c\gamma \end{bmatrix}.$$

For the first direction vector of each vector, the second direction vector of the vector in the world coordinate system may be acquired by multiplying the first direction vector with the above Euler rotation matrix.

In S308, the vector length of the vector is calculated based on the two-dimensional coordinates in the heat maps.

The vector is formed by two hand key points. For each vector, the two hand key points forming the vector may be determined. Based on the heat maps of the two hand key points, the two-dimensional coordinates of the two hand key points are determined, and then the length of the vector is calculated based on the two-dimensional coordinates of the two hand key points.

In this embodiment of the present disclosure, the heat map of each hand key point indicates the distribution of a position of the hand key point in the heat map. Each pixel point in the heat map may be associated with a probability value, and the probability value represents a probability of the hand key point at each pixel point. Therefore, determining, based on the heat maps of the two hand key points, the two-dimensional coordinates of the two hand key points includes: determining, for each hand key point, the pixel point with the greatest probability value from the heat maps of the hand key points; acquiring local two-dimensional coordinates by acquiring coordinates of the pixel point with the greatest probability value in the heat map, and converting the local two-dimensional coordinates into coordinates in the hand image to acquire the two-dimensional coordinates of the hand key points. That is, the coordinates of the hand key points in the heat maps (the position of the pixel point with the greatest probability value) are firstly determined. In this case, because the heat map is proportional to the hand image, the coordinates, that is, the two-dimensional coordinates, of the hand key points in the hand image are acquired by multiplying the coordinates of the hand key points in the heat maps by a proportional coefficient.

As shown in FIG. 2, the vector is a representation of the vector length and the vector direction. Assuming that the vector D from the wrist key point to the key point MCP of the ring finger is (X, Y, Z), D is equal to a product of m and A as a second direction vector A of the vector D is (x, y, z), wherein m is the vector length. The second direction vector A is projected onto the x-y plane to acquire the direction vector B=(x, y, 0).

In this case, the two-dimensional coordinates of all hand key points may be acquired based on the heat maps, and the two-dimensional coordinates are also projections of the hand key points onto the x-y plane. Since the projection C of the vector D onto the x-y plane is (X, Y, 0), that is, C is equal to a product of m and B, the coordinates X and Y in the projection C are the two-dimensional coordinates acquired based on the heat map. That is, in the case that B and C are known, the vector length m may be acquired, and the vector D may be acquired in the case that the direction vector A is known.

In S309, the vector is acquired by calculating a product of the vector length and the second direction vector.

That is, the vector is the representation of the vector length and the direction vector, and the product of the vector length and the second direction vector is calculated as the vector. For example, the vector D is equal to a product of m and A, wherein m is the vector length, and A is the direction vector of the vector.

In S310, three-dimensional coordinates of the two hand key points forming the vector in the world coordinate system are calculated based on the vector.

In this embodiment of the present disclosure, the three-dimensional coordinates of the wrist key point in the hand key points in the world coordinate system may be acquired, and the three-dimensional coordinates of the two hand key points forming the vector in the world coordinate system are calculate based on the three-dimensional coordinates of the wrist key point in the world coordinate system and the vector.

The three-dimensional coordinates of the wrist key point in the world coordinate system may be acquired based on the hand image. That is, the three-dimensional coordinates of the wrist key point in the world coordinate system may be acquired from the hand image according to a near-large and far-small imaging principle.

Assuming that the coordinates of the wrist key point in the world coordinate system are O (X0, Y0, Z0), and the vector from the wrist key point O to the key point MCP of each finger is D (X, Y, Z), the three-dimensional coordinates (X0+X, Y0+Y, Z0+Z) of the key point MCP are a sum of (X0, Y0, Z0) and (X, Y, Z). That is, in the two hand key points forming the vector, the three-dimensional coordinates of the other hand key point may be acquired by vector summing in the case that the three-dimensional coordinates of one hand key point and the vector are acquired.

In this embodiment of the present disclosure, for each finger, the three-dimensional coordinates of each hand key point may be calculated successively based on the connection sequence of a physiological structure of the hand key points on the finger and the wrist key point. For example, for the little finger in FIG. 2, in the case that the three-dimensional coordinates of the wrist key point O are acquired, and the vector B from the wrist key point O to the key point MCP of the little finger has been acquired, the three-dimensional coordinates of the key point MCP of the little finger may be acquired by vector summing the three-dimensional coordinates of the wrist key point O and the vector B. Meanwhile, in the case that the vector E from the key point MCP of the little finger to the key point PIP of the little finger has been acquired, the three-dimensional coordinates of the key point PIP of the little finger may be calculated based on the three-dimensional coordinates of the key point MCP of the little finger and the vector E. The above processes are repeated until the three-dimensional coordinates of the key point TIP of the little finger are acquired.

In this embodiment of the present disclosure, the hand is detected from the acquired original image, and the hand image to be detected is captured. The heat maps of the hand key points and the hand structured connection information containing the joint bending angles and the Euler angles are acquired by the heat map model and the three-dimensional information prediction model. The first direction vector of the vector formed by the hand key points in the hand coordinate system is calculated based on the joint bending angles, and the first direction vector is converted into the second direction vector in the world coordinate system based on the Euler angles. The two-dimensional coordinates of multiple hand key points are acquired based on the heat maps to calculate the vector length of the vector, the vectors at multiple hand key points are determined based on the vector length and the second direction vector, and then the three-dimensional coordinates of the hand key points forming the vector in the world coordinate system can be calculated based on the vector. The two-dimensional coordinates and the hand structured connection information are predicted successively by the two models to calculate the three-dimensional coordinates of the hand key points. Compared with direct regression of the three-dimensional coordinates of the hand key points using the deep neural network, both the models have simple structures and small amount of calculation, and are applicable to the mobile terminal with a limited calculation capacity. In addition, due to the simple structures and the small amounts of calculation of the models, the time of the detection of the hand key points is short, such that the hand key points may be detected in the mobile terminal in real time, and it is beneficial to apply the gesture recognition to the mobile terminal.

Third Embodiment

Figure 5:
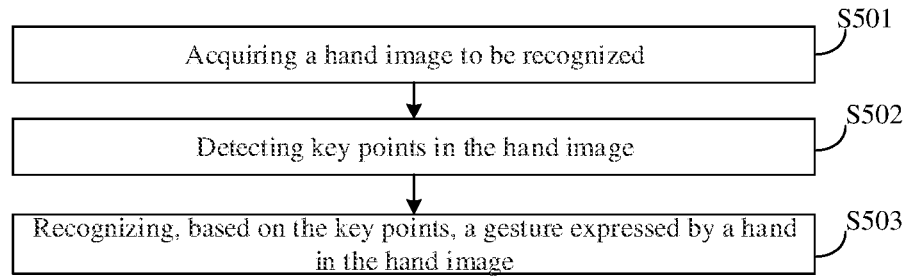
FIG. 5 is a flowchart of a method for recognizing a gesture according to a third embodiment of the present disclosure.

FIG. 5 is a flowchart of a method for recognizing a gesture according to third embodiment of the present disclosure. This embodiment of the present disclosure is applicable to the case of recognizing a gesture based on a hand image, and the method may be performed by an apparatus for recognizing a gesture. The apparatus may be implemented via software and/or hardware, and integrated in a device for performing the method. As shown in FIG. 5, the method for recognizing a gesture according to this embodiment of the present disclosure may include the following processes.

In S501, a hand image to be recognized is acquired.

In this embodiment of the present disclosure, the hand image to be recognized may be an image of which a gesture needs to be recognized, and the hand image may be an image acquired in scenarios of gesture recognition application. Optionally, the scenarios of gesture recognition application may be scenarios such as a human-computer interaction (a VR control) controlled by the gesture, and a sign language recognition (a sign language teaching). In the above scenarios, the hand image may be collected by an image collection apparatus, or the hand image may be acquired from the image by recognizing the image. The scenario and method for acquiring the hand image are not limited in this embodiment of the present disclosure.

In S502, key points in the hand image are detected.

The hand image to be recognized may be input into a pre-trained heat map model to acquire heat maps of the hand key points, and the heat maps include two-dimensional coordinates of the hand key points. The heat maps and the hand image are input to a pre-trained three-dimensional information prediction model to acquire hand structured connection information. Three-dimensional coordinates of the hand key points in a world coordinate system are determined based on the hand structured connection information and the two-dimensional coordinates in the heat maps.

In this embodiment of the present disclosure, the detection of the hand key points is to determine the three-dimensional coordinates of multiple hand key points of a hand in space. The three-dimensional coordinates of the hand key points in the hand image in a three-dimensional space may be detected by the method for detecting the hand key points according to first embodiment or second embodiment of the present disclosure, and first embodiment or second embodiment may be referred to, which are not described in detail herein.

In S503, the gesture expressed by the hand in the hand image is recognized based on the key points.

The gesture is formed form multiple key points of fingers at different positions, and different gestures may express different meanings. Gesture recognition is to recognize the gesture expressed by the three-dimensional coordinates of multiple key points of the fingers.

Figure 6:
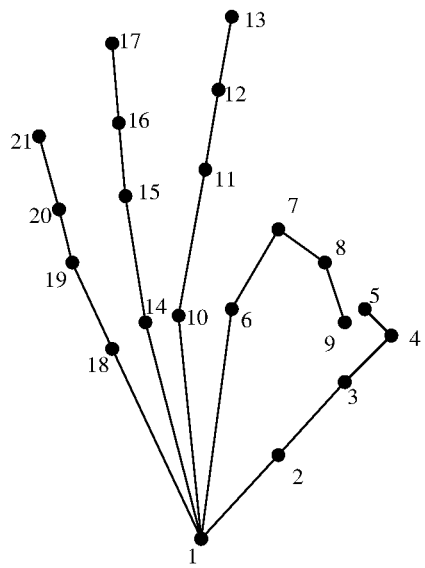
FIG. 6 is a schematic diagram of hand key points detected during gesture recognition in an embodiment of the present disclosure.
Figure 7:
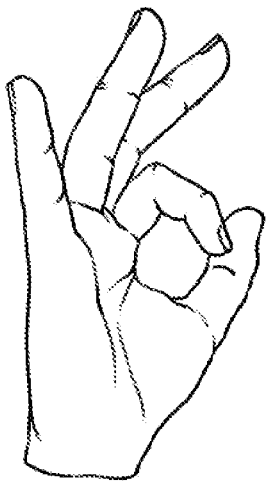
FIG. 7 is a schematic diagram of a gesture expressed by the hand key points in FIG. 6.

FIG. 6 is a schematic diagram of the hand key points detected during gesture recognition in an embodiment of the present disclosure. As shown in FIG. 6, the hand may include 21 key points, and in the case that the three-dimensional coordinates of the 21 key points are acquired, the gesture expressed by the hand in the hand image may be recognized based on the three-dimensional coordinates. In an example of the present disclosure, multiple hand key points may be connected according to a skeletal structure of the hand, and the gesture expressed by the hand is recognized based on the three-dimensional coordinates of the multiple hand key points. For example, a hand skeleton image is acquired in the case that the multiple hand key points are connected, and the gesture may be acquired by recognizing the hand skeleton image. FIG. 7 shows a schematic diagram of the gesture expressed by the detected hand key points in FIG. 6.

In the method for recognizing the gesture in this embodiment of the present disclosure, after the image to be recognized is acquired, the hand key points are detected by the method for detecting hand key points according to this embodiment of the present disclosure, and the gesture expressed by the hand in the hand image is recognized based on the key points. In the detection of the hand key points, the two-dimensional coordinates and the hand structured connection information are predicted successively by two models, and the three-dimensional coordinates of the hand key points are necessary to be directly regressed using a deep neutral network. Thus, both the models have simple structures and small amount of calculation, and are applicable to the mobile terminal with a limited calculation capacity. In addition, due to the simple structures and the small amounts of calculation of the models, the time of the detection of the hand key points is short, such that the hand key points may be detected in the mobile terminal in real time, and it is beneficial to apply the gesture recognition to the mobile terminal.

Fourth Embodiment

Figure 8:
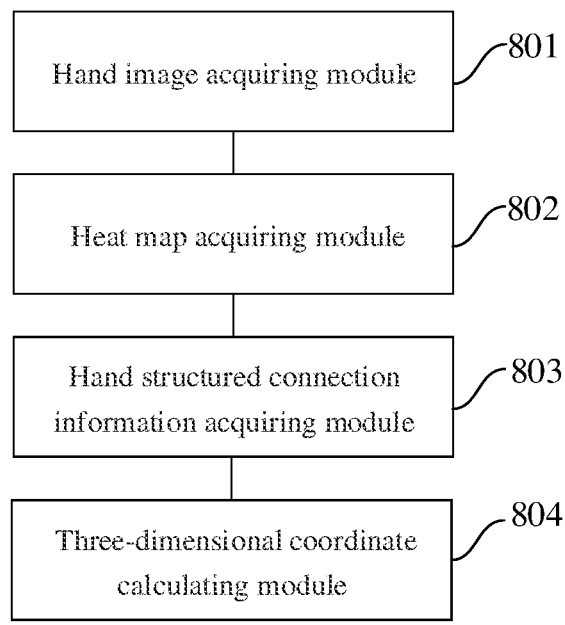
FIG. 8 is a structural block diagram of an apparatus for detecting hand key points according to a fourth embodiment of the present disclosure.

FIG. 8 is a structural block diagram of an apparatus for detecting hand key points according to a fourth embodiment of the present disclosure, the apparatus for detecting hand key points according to the embodiment of the present disclosure may include: a hand image acquiring module 801, configured to acquire a hand image to be detected; a heat map acquiring module 802, configured to acquire heat maps of the hand key points by inputting the hand image into a pre-trained heat map model, wherein the heat maps include two-dimensional coordinates of the hand key points; a hand structured connection information acquiring module 803, configured to acquire hand structured connection information by inputting the heat maps and the hand image into a pre-trained three-dimensional information prediction model; and a three-dimensional coordinate calculating module 804, configured to determine, based on the hand structured connection information and the two-dimensional coordinates in the heat maps, three-dimensional coordinates of the hand key points in a world coordinate system.

The apparatus for detecting hand key points according to this embodiment of the present disclosure may perform the method for detecting the hand key points according to the embodiment of the present disclosure, and has corresponding functional modules and effects of performing the method.

Fifth Embodiment

Figure 9:
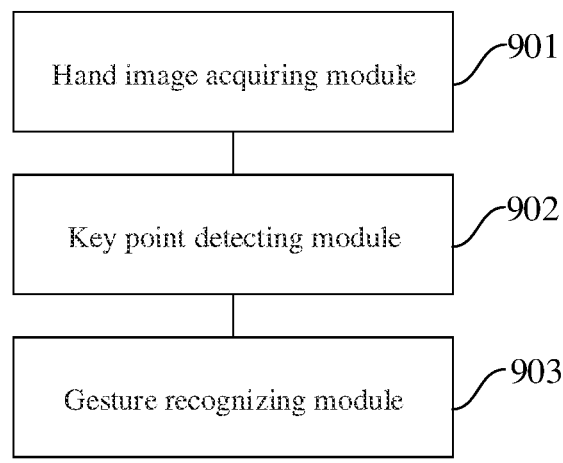
FIG. 9 is a structural block diagram of an apparatus for recognizing a gesture according to a fifth embodiment of the present disclosure.

FIG. 9 is a structural block diagram of an apparatus for recognizing a gesture according to a fifth embodiment of the present disclosure. The apparatus for recognizing a gesture according to this embodiment of the present disclosure may include: a hand image acquiring module 901, configured to acquire a hand image to be recognized; a key point detecting module 902, configured to detect key points in the hand image; and a gesture recognizing module 903, configured to recognize, based on the key points, the gesture expressed by a hand in the hand image; wherein the key points are detected by the apparatus for detecting hand key points according to the fourth embodiment.

The apparatus for recognizing the gesture according to this embodiment of the present disclosure may perform the method for recognizing the gesture according to the embodiment of the present disclosure, and has corresponding functional modules and effects of performing the method.

Sixth Embodiment

Figure 10:
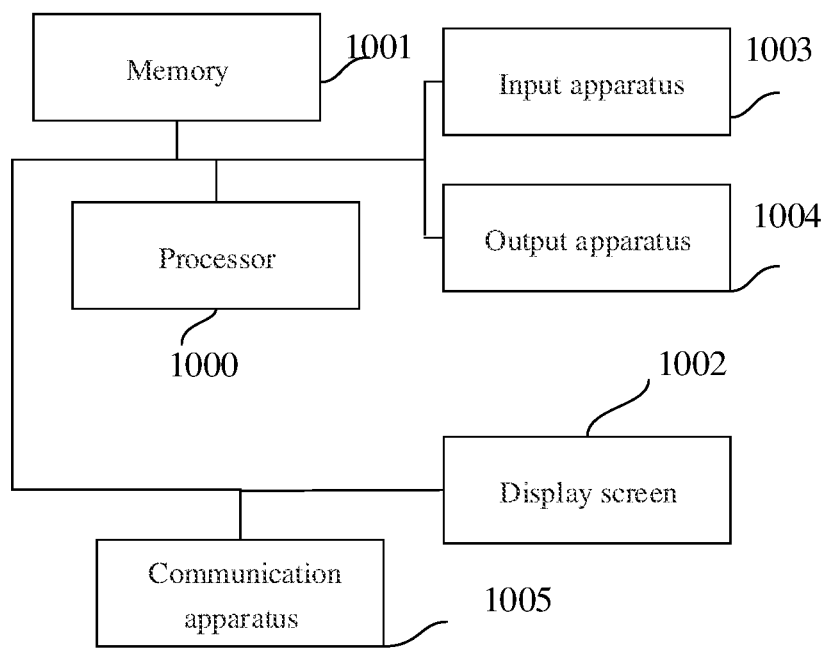
FIG. 10 is a structural block diagram of a device according to a sixth embodiment of the present disclosure.

Referring to FIG. 10, a schematic structural diagram of a device in an embodiment of the present disclosure is shown. As shown in FIG. 10, the device may include: a processor 1000, a memory 1001, a display screen 1002 with a touch function, an input apparatus 1003, an output apparatus 1004, and a communication apparatus 1005. The number of the processors 1000 in the device may be one or more, and FIG. 10 is taken one processor 1000 as an example. The number of the memories 1001 in the device may be one or more, and FIG. 10 is taken one memory 1001 as an example. The processor 1000, the memory 1001, the display screen 1002, the input apparatus 1003, the output apparatus 1004, and the communication apparatus 1005 in the device may be connected through a bus or other means. FIG. 10 is taken the connection through a bus as an example.

The memory 1001, as a computer-readable storage medium, may be configured to store software programs, computer-executable programs and modules, such as program instructions/modules corresponding to the methods for detecting the hand key points according to the first embodiment and the second embodiment of the present disclosure (for example, the hand image acquiring module 801, the heat map acquiring module 802, the hand structured connection information acquiring module 803, and the three-dimensional coordinate calculating module 804 in the above apparatus for detecting the hand key points), or program instructions/modules corresponding to the method for recognizing the gesture according to the third embodiment of the present disclosure (for example, the hand image acquiring module 901, the key point detecting module 902, and the gesture recognizing module 903 in the above apparatus for recognizing the gesture).

The processor 1000 performs various functional applications and data processing of the device by running the software programs, instructions and modules stored in the memory 1001. That is, the above method for detecting the hand key points and/or the method for recognizing the gesture is performed.

In the embodiment, the processor 1000, when loading and running one or more programs stored in the memory 1001, is caused to perform the processes of the method for detecting the hand key points and/or the method for recognizing the gesture according to the embodiments of the present disclosure.

The embodiments of the present disclosure further provide a computer-readable storage medium. Instructions in the storage medium, when loaded and run by a processor of a device, causes the device to perform the method for detecting the hand key points and/or the method for recognizing the gesture according to the above method embodiments.

For the apparatus, device, and storage medium embodiments, since they are basically similar to the method embodiments, the description is relatively simple, and the relevant parts may be referred to partial descriptions of the method embodiments.

From the above description of the embodiments, it can be clearly understood for those skilled in the art that the present disclosure may be implemented via software and necessary general-purpose hardware, and may also be implemented via hardware. The present disclosure may be embodied in the form of a software product, and the computer software product may be stored in the computer-readable storage medium, such as a floppy disk, a read-only memory (ROM), a random access memory (RAM), a flash memory (FLASH), a hard disk, an optical disk of a computer, or the like. And the computer software product includes multiple instructions configured to cause a computer device (may be a robot, a personal computer, a server, or a network device, and the like) to perform the method for detecting the hand key points and/or the method for recognizing the gesture according to any embodiment of the present disclosure.

In the above apparatus for detecting the hand key points and/or apparatus for recognizing the gesture, the included multiple units and modules are only divided according to functional logic, but are not limited to the above division, as long as the corresponding functions can be realized. In addition, the names of the multiple functional units are only for the convenience of distinguishing from each other, and are not used to limit the protection scope of the present disclosure.

What is claimed is:

1. A method for detecting hand key points, comprising:
   acquiring a hand image to be detected;
   acquiring heat maps of the hand key points by inputting the hand image into a pre-trained heat map model, wherein the heat maps comprise two-dimensional coordinates of the hand key points;
   acquiring hand structured connection information by inputting the heat maps and the hand image into a pre-trained three-dimensional information prediction model;
   determining, based on the hand structured connection information and the two-dimensional coordinates in the heat maps, three-dimensional coordinates of the hand key points in a world coordinate system; and
   recognizing, based on three-dimensional coordinates of the hand key points in the world coordinate system, a gesture expressed by a hand in the hand image to detect the hand key points in real time through a mobile terminal;
   wherein the hand structured connection information comprises joint bending angles formed by the hand key points and Euler angles of the hand; and determining, based on the hand structured connection information and the two-dimensional coordinates in the heat maps, the three-dimensional coordinates of the hand key points in the world coordinate system comprises:
      calculating, based on the joint bending angles, a first direction vector of a vector formed by two hand key points in a hand coordinate system of the hand;
      converting the first direction vector into a second direction vector in the world coordinate system based on the Euler angles;
      calculating a vector length of the vector based on the two-dimensional coordinates in the heat maps;
      acquiring the vector by calculating a product of the vector length and the second direction vector; and
      calculating the three-dimensional coordinates of the two hand key points forming the vector in the world coordinate system based on the vector.

2. The method according to claim 1, wherein acquiring the hand image to be detected comprises:
   acquiring an original image;
   detecting a hand from the original image; and
   capturing an image having a preset size and containing the hand as the hand image to be detected.

3. The method according to claim 1, wherein acquiring the heat maps of the hand key points by inputting the hand image into the pre-trained heat map model comprises:
   acquiring the heat map of each hand key point by inputting the hand image into the pre-trained heat map model, wherein a size of the heat map of each hand key point is equal to a size of the hand image.

4. The method according to claim 1, wherein the heat maps comprise heat maps of all hand key points, and acquiring the hand structured connection information by inputting the heat maps and the hand image into the pre-trained three-dimensional information prediction model comprises:
   acquiring joint bending angles formed by the hand key points and Euler angles of the hand by inputting the heat maps of all hand key points and the hand image into the pre-trained three-dimensional information prediction model.

5. The method according to claim 1, wherein calculating, based on the joint bending angles, the first direction vector of the vector formed by the two hand key points in the hand coordinate system of the hand comprises:
   determining, based on a pre-established hand model, a first direction vector of a vector from a wrist key point to a proximal phalanx key point of a middle finger;
   calculating a first direction vector of a vector from the wrist key point to a proximal phalanx key point of each finger based on the joint bending angles and the first direction vector of the vector from the wrist key point to the proximal phalanx key point of the middle finger; and
   calculating the first direction vector of the vector between the two key points connected by the phalanxes of each finger based on the joint bending angles and the first direction vector of the vector from the wrist key point to the proximal phalanx key point of each finger.

6. The method according to claim 1, wherein converting the first direction vector into the second direction vector in the world coordinate system based on the Euler angles comprises:
   calculating an Euler rotation matrix based on the Euler angles; and
   acquiring the second direction vector of the first direction vector in the world coordinate system by calculating a product of the first direction vector and the Euler rotation matrix.

7. The method according to claim 1, wherein calculating the vector length of the vector based on the two-dimensional coordinates in the heat maps comprises:
   determining the two hand key points forming the vector;
   determining, based on the heat maps of the two hand key points, two-dimensional coordinates of the two hand key points; and
   calculating the vector length of the vector based on the two-dimensional coordinates of the two hand key points.

8. The method according to claim 7, wherein
each pixel point on the heat maps is associated with a probability value, wherein the probability value represents a probability of the hand key point at each pixel point; and
determining, based on the heat maps of the two hand key points, the two-dimensional coordinates of the two hand key points comprises:
  determining a pixel point with a greatest probability value from the heat map of each hand key point;
  acquiring local two-dimensional coordinates by acquiring coordinates of the pixel point with the greatest probability value in the heat map; and
  acquiring the two-dimensional coordinates of each hand key point by converting the local two-dimensional coordinates to coordinates in the hand image.

9. The method according to claim 1, wherein calculating the three-dimensional coordinates of the two hand key points forming the vector in the world coordinate system based on the vector comprises:
  acquiring the three-dimensional coordinates of a wrist key point in the hand key points in the world coordinate system; and
  calculating the three-dimensional coordinates of the two hand key points forming the vector in the world coordinate system based on the three-dimensional coordinates of the wrist key point in the world coordinate system and the vector.

10. A method for recognizing a gesture, comprising:
acquiring a hand image to be recognized;
detecting key points in the hand image; and
recognizing, based on the key points, the gesture expressed by a hand in the hand image;
wherein detecting the key points in the hand image comprises: detecting the key points in the hand image according to a method for detecting hand key points, comprising:
acquiring a hand image to be detected;
acquiring heat maps of the hand key points by inputting the hand image into a pre-trained heat map model, wherein the heat maps comprise two-dimensional coordinates of the hand key points;
acquiring hand structured connection information by inputting the heat maps and the hand image into a pre-trained three-dimensional information prediction model;
determining, based on the hand structured connection information and the two-dimensional coordinates in the heat maps, three-dimensional coordinates of the hand key points in a world coordinate system; and
recognizing, based on three-dimensional coordinates of the hand key points in the world coordinate system, the gesture expressed by the hand in the hand image to detect the hand key points in real time through a mobile terminal;
wherein the hand structured connection information comprises joint bending angles formed by the hand key points and Euler angles of the hand; and determining, based on the hand structured connection information and the two-dimensional coordinates in the heat maps, the three-dimensional coordinates of the hand key points in the world coordinate system comprises:
  calculating, based on the joint bending angles, a first direction vector of a vector formed by two hand key points in a hand coordinate system of the hand;
  converting the first direction vector into a second direction vector in the world coordinate system based on the Euler angles;
  calculating a vector length of the vector based on the two-dimensional coordinates in the heat maps;
  acquiring the vector by calculating a product of the vector length and the second direction vector; and
  calculating the three-dimensional coordinates of the two hand key points forming the vector in the world coordinate system based on the vector.

11. A device for detecting hand key points, comprising:
at least one processor; and
a memory, configured to store at least one program, wherein
the at least one program, when loaded and run by the at least one processor, causes the at least one processor to perform a method for detecting hand key points, comprising:
acquiring a hand image to be detected;
acquiring heat maps of the hand key points by inputting the hand image into a pre-trained heat map model, wherein the heat maps comprise two-dimensional coordinates of the hand key points;
acquiring hand structured connection information by inputting the heat maps and the hand image into a pre-trained three-dimensional information prediction model;
determining, based on the hand structured connection information and the two-dimensional coordinates in the heat maps, three-dimensional coordinates of the hand key points in a world coordinate system; and
recognizing, based on three-dimensional coordinates of the hand key points in the world coordinate system, a gesture expressed by a hand in the hand image to detect the hand key points in real time through a mobile terminal;
wherein the hand structured connection information comprises joint bending angles formed by the hand key points and Euler angles of the hand; and determining, based on the hand structured connection information and the two-dimensional coordinates in the heat maps, the three-dimensional coordinates of the hand key points in the world coordinate system comprises:
  calculating, based on the joint bending angles, a first direction vector of a vector formed by two hand key points in a hand coordinate system of the hand;
  converting the first direction vector into a second direction vector in the world coordinate system based on the Euler angles;
  calculating a vector length of the vector based on the two-dimensional coordinates in the heat maps;
  acquiring the vector by calculating a product of the vector length and the second direction vector; and
  calculating the three-dimensional coordinates of the two hand key points forming the vector in the world coordinate system based on the vector.

12. The device according to claim 11, wherein acquiring the hand image to be detected comprises:
acquiring an original image;
detecting a hand from the original image; and
capturing an image having a preset size and containing the hand as the hand image to be detected.

13. The device according to claim 11, wherein acquiring the heat maps of the hand key points by inputting the hand image into the pre-trained heat map model comprises:
  acquiring the heat map of each hand key point by inputting the hand image into the pre-trained heat map model, wherein a size of the heat map of each hand key point is equal to a size of the hand image.

14. The device according to claim 11, wherein the heat maps comprise heat maps of all hand key points, and acquiring the hand structured connection information by inputting the heat maps and the hand image into the pre-trained three-dimensional information prediction model comprises:
- acquiring joint bending angles formed by the hand key points and Euler angles of the hand by inputting the heat maps of all hand key points and the hand image into the pre-trained three-dimensional information prediction model.

15. The device according to claim 11, wherein calculating, based on the joint bending angles, the first direction vector of the vector formed by the two hand key points in the hand coordinate system of the hand comprises:
- determining, based on a pre-established hand model, a first direction vector of a vector from a wrist key point to a proximal phalanx key point of a middle finger;
- calculating a first direction vector of a vector from the wrist key point to a proximal phalanx key point of each finger based on the joint bending angles and the first direction vector of the vector from the wrist key point to the proximal phalanx key point of the middle finger; and
- calculating the first direction vector of the vector between the two key points connected by the phalanxes of each finger based on the joint bending angles and the first direction vector of the vector from the wrist key point to the proximal phalanx key point of each finger.

16. A non-transitory computer-readable storage medium, storing at least one computer program, wherein the at least one computer program, when loaded and run by a processor, causes the processor to perform a method for detecting hand key points as defined in claim 1.

17. A device for recognizing a gesture, comprising:
- at least one processor; and
- a memory, configured to store at least one program, wherein
- the at least one program, when loaded and run by the at least one processor, causes the at least one processor to perform the method for recognizing the gesture as defined in claim 10.

18. A non-transitory computer-readable storage medium, storing at least one computer program, wherein the at least one computer program, when loaded and run by a processor, causes the processor to perform a method for recognizing a gesture as defined in claim 10.

* * * * *